United States Patent
Marcellin et al.

(10) Patent No.: US 7,110,605 B2
(45) Date of Patent: Sep. 19, 2006

(54) DIGITAL INTERMEDIATE (DI) PROCESSING AND DISTRIBUTION WITH SCALABLE COMPRESSION IN THE POST-PRODUCTION OF MOTION PICTURES

(75) Inventors: Michael W. Marcellin, Tucson, AZ (US); Ali Bilgin, Tucson, AZ (US)

(73) Assignee: DTS AZ Research, LLC, (US)

( * ) Notice: Subject to any disclaimer, the term of this patent is extended or adjusted under 35 U.S.C. 154(b) by 50 days.

(21) Appl. No.: 11/051,771

(22) Filed: Feb. 4, 2005

(65) Prior Publication Data

US 2006/0177139 A1 Aug. 10, 2006

(51) Int. Cl.
G06K 9/36 (2006.01)

(52) U.S. Cl. .................................... 382/232

(58) Field of Classification Search ........ 382/232–236, 382/238–240, 244–250; 709/229–232, 246–247; 375/240.01–240.03, 240.11, 240.18–240.25; 358/1.2, 426.01–426.16
See application file for complete search history.

(56) References Cited

U.S. PATENT DOCUMENTS 5,577,191 A 11/1996 Bonomi
6,522,418 B1 * 2/2003 Yokomizo et al. ......... 358/1.15
6,870,547 B1 * 3/2005 Crosby et al. ............. 345/619
2003/0215146 A1 11/2003 Schwartz

OTHER PUBLICATIONS

ITU-T Rec. T.800/ISO/IEC 15444-1:2004 "JPEG 2000 Image Coding System".
JPEG2000 Image Coding System, 2004, DS Taubman and M.W. Marcellin, in JPEG2000: Image Compression Fundamentals, Practice and Standards, Kluwer Publishing 2002.

* cited by examiner

Primary Examiner—Jose L. Couso
(74) Attorney, Agent, or Firm—Blake A. Welcher; Eric A. Gifford; William L. Johnson

(57) ABSTRACT

Scalable image compression is exploited to facilitate the creative process in the post-production of motion pictures. Specifically, digital intermediate (DI) processing of motion pictures is enabled by dynamically rendering proxies in response to client requests. A DI application is designed to enhance the efficiency of post-processing and the quality of the work product of the editors, colorists and other creative people. The DI application also provides a method for efficiently formatting the product for film, digital cinema, DVD and other video applications.

38 Claims, 12 Drawing Sheets

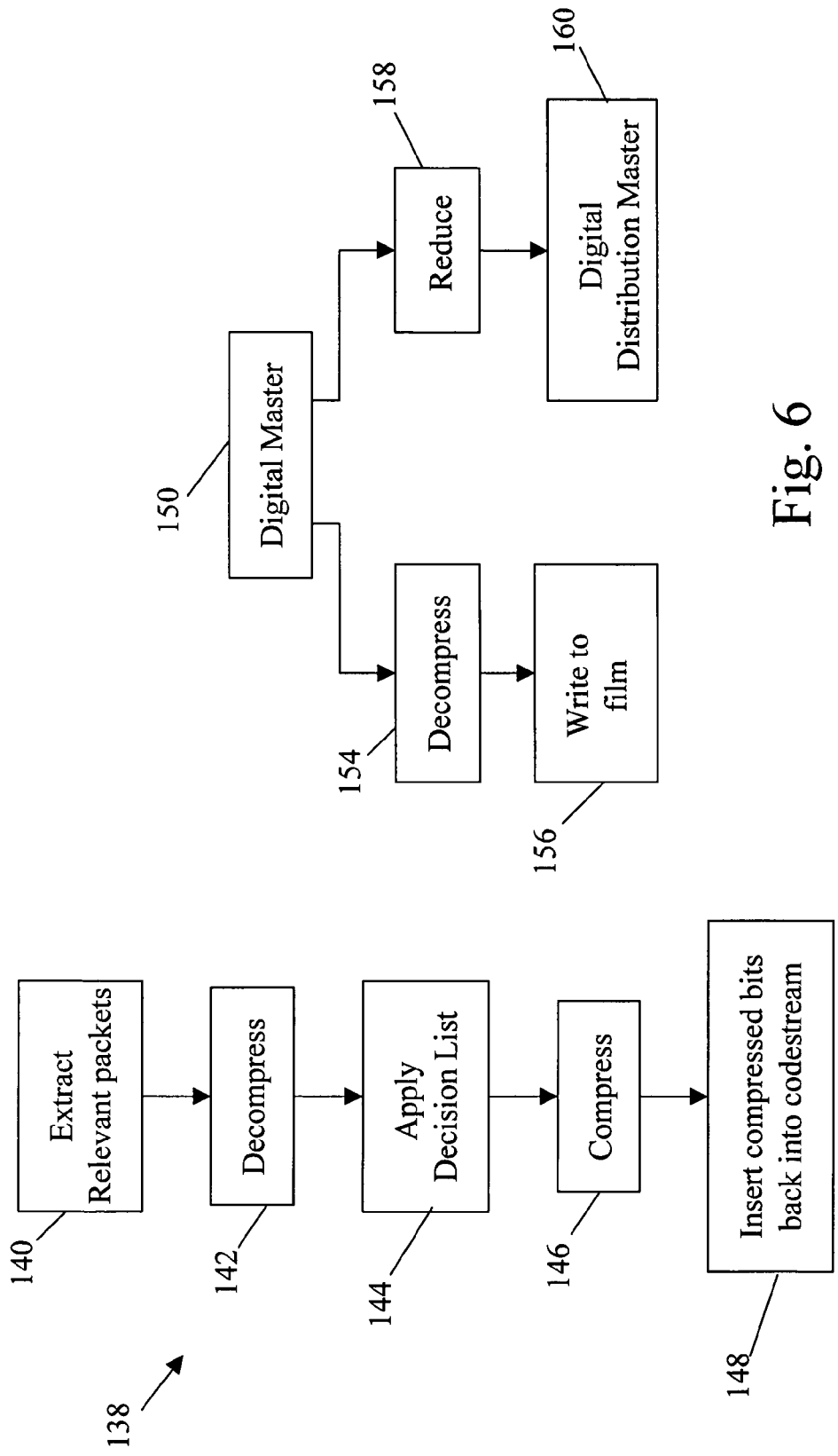

DIGITAL INTERMEDIATE (DI) PROCESSING AND DISTRIBUTION WITH SCALABLE COMPRESSION IN THE POST-PRODUCTION OF MOTION PICTURES

BACKGROUND OF THE INVENTION

1. Field of the Invention

This invention relates to the workflow employed in the creation of motion pictures and video and more specifically to the tasks encountered in digital intermediate processing in the post-production of motion pictures.

2. Description of the Related Art

Digital Intermediate (DI) Processing

While a small but growing number of motion pictures are being recorded and/or exhibited using digital cameras and/or digital projectors, most motion pictures are recorded and exhibited using film. The process of taking the originally recorded images and assembling them into the completed motion picture is known as post-production. Even though a motion picture may be recorded and exhibited using film, a large and growing number of motion pictures are employing digital processing techniques in post-production. This processing is known as digital intermediate (DI) processing. DI Processing facilitates performing many common post-production tasks by computer. These tasks are generically referred to here as "post-processing". Examples of such tasks include: editing (deciding which images will be included and in what order), color correction, special effects, pan & scan, sub-titles, shot separation, re-framing, scene classification, artifact removal, resolution enhancement, noise reduction, sharpening, and verification. After DI processing, the images are recorded back to film to create the various prints involved in the mastering and distribution of motion pictures.

As shown in FIG. 1, original recorded data (step 12) consisting of a sequence of images 14 on film 16 is received at the post-production house. Each image 14 is scanned (step 17) to create a digital image 18. The sequence of digital images are stored (step 20) in mass storage. To maintain a high degree of faithfulness to the original film, scanning is often done at a high resolution. For example, digital images of sizes 2048×1080 (2K) or even 4096×2160 (4K) might result. Such large images can be quite cumbersome. Most computer monitors can not display images this large. Additionally, real time processing of such large images is often not possible.

The DI process creates a reduced resolution "proxy" of each image for post-processing. This is done by down sampling (step 22) the digital image 18 to a fixed resolution. Each down sampled version is then compressed (step 24) at a fixed quality level and the compressed proxies are stored (step 26). The selection of the resolution and quality level represents a tradeoff among processing power, storage capacity, display capability and the requirements of the various editing functions. When a post-processor (editor, colorist, etc.) requests a certain scene or cut (step 28), the corresponding compressed images are decompressed (step 30) to display the sequence of proxies 32. The proxies are distinct digital images, created from, but entirely separate from the digital versions of the original images. Storage of the compressed proxies is required in addition to storage of the digital versions of the original images.

The proxies are displayed on a computer workstation 34 and post-processed (step 36). As mentioned above, post-processing includes any processing that affects an image including but not limited to deciding which images are included in the motion picture and in what order they are to be viewed, color correction, etc. Post-processing generates one or more decision lists (step 38) that include a list of the operations that were carried out on each of the proxies. Typically, there would be a decision list for editing, another list for color correction and so on. Once editing, color correction etc., are completed on the proxies, the decision lists are applied to the digital images 18 so that the same operations are carried out on the digital versions of original images (step 40). The DI process produces an uncompressed digital master 42. The images in the digital master are recorded back to film to create the various prints involved in the mastering and distribution of motion pictures (step 44).

As mentioned above, the selection of the fixed resolution and fixed quality level for the "proxy" represents a tradeoff among processing power, storage capacity, display capability and the requirements of the various post-processing functions. The proxy is fixed and can not be optimized for any particular function or changing film content. As a result, the editor, colorist or special effects artists are limited in their capabilities to view the images, which in turn affects their efficiency and ultimately the quality of the digital master.

U.S. Pat. No. 5,577,191 describes a digital video editing and publishing system in which digital video data are compressed, intraframe-only, and stored. Selected frames of the compressed data are decompressed, edited and recompressed. The edited and compressed video sequence is decompressed and then recompressed using both intraframe and interframe compression. The parameters of the intraframe compression used in creating this digital master file are set such that the decompressed image is of a selected resolution and quality commensurate with the target publication medium. This approach combines the ability to decompress and edit individual frames by using intraframe compression only initially and the superior compression capability of intraframe and interframe compression. This approach does not utilize a proxy for editing. Consequently, if the target publication medium is of very high resolution the editing process may be very cumbersome.

Image Compression

Image compression is one of the key technologies fueling the expansion of applications such as DI processing that utilize digital imagery. Since the amount of data in images can be quite large, images are rarely transmitted or stored without compression. Image compression aims to represent an image with as few bits as possible while preserving the desired level of quality. The DI process follows downsampling by compression to create proxies that are sufficiently reduced to be processed in real-time and capable of display on editing workstations. Arguably, the most successful image compression standard has been the JPEG (Joint Photographic Experts Group) standard, which is often used to create proxies in the DI process.

JPEG2000 is the new international image compression standard (ISO/IEC 15444) and offers state-of-the-art compression performance for still imagery. JPEG2000 also offers a number of functionalities designed to specifically address the transmission and storage requirements of emerging imaging applications. In particular, JPEG2000 offers several mechanisms to provide for scalability and random access into compressed codestreams to reduce the amount of data to be transmitted during distribution of large digital images. To this end, the image data are compressed and stored in packets in the codestreams.

Low resolution versions of an image can be extracted and/or decompressed by accessing only the packets corresponding to low resolution subbands. For example, if the original image size is say 2048×1080, smaller versions of the image can be extracted at sizes of 1024×540, 512×270, etc. It might be said that the smaller versions are "zoomed out" or "overview" versions of the original. Each of the smaller images may contain the full spatial extent (field of view) of its corresponding original.

Reduced spatial extents (spatial regions) can be extracted and/or decompressed by accessing only the packets corresponding to the desired spatial region. This can be done at full resolution, or any reduced resolution as described in the previous paragraph. This feature allows the extraction of a "cropped" version of the original image, or a reduced resolution version of the cropped image.

Reduced quality images can be extracted by accessing only the packets corresponding to a number of initial quality layers. This can be done at full resolution, or any reduced resolution. Additionally, this can be done for the full spatial extent, or any spatial region as described in the previous paragraph. In fact, different qualities can be achieved at different spatial locations within the same image.

All of the features above can be used to extract a version of the image that is "reduced" in one way or another. In each case, only the packets relevant to the desired resolution, spatial extent, and/or quality need be accessed. Accessing other packets is not required. These features greatly decrease the amount of data to be transmitted in an image communication application As described above, the JPEG2000 features were developed to facilitate transmission of large images. For this reason, it is being adopted for use in many applications. Specifically, JPEG2000 has been adopted by the medical imagery standards body known as DICOM for storage and distribution of medical imagery. Additionally, JPEG2000 is being used for distributing large overhead images as well as maps. These images and maps can be viewed in an interactive way to reveal different spatial regions at resolutions desired by the user. The library of congress is considering using JPEG2000 to allow users to browse archival imagery over the internet. Significantly, JPEG2000 has been selected for the distribution of Digital Motion Pictures. This selection was based largely on the fact that a single file can serve both high resolution, as well as medium resolution projectors. Specifically, the entire file may be suitable for a high resolution projector. Alternately, medium resolution imagery can be extracted (at the theater) for use by a medium resolution projector.

SUMMARY OF THE INVENTION

The present invention provides for the exploitation of scalable image compression to facilitate the creative process in the post-production of motion pictures. Specifically, the present invention enables digital intermediate (DI) processing of motion pictures by dynamically rendering proxies in response to client requests. A DI application is designed to enhance the efficiency of post-processing and the quality of the work product by providing the editors, colorists and other creative people the capability to select the regions, resolution and quality level of the proxy video clips they process. The DI application also provides a method for efficiently applying decision lists to the full (non-proxy) version of the codestream, as well as formatting the edited product for film, digital cinema, DVD and other video applications.

Digital images from a motion picture are compressed at a very high quality, perhaps lossless, using a scalable compression algorithm such as JPEG2000 and stored as a compressed codestream. The uncompressed digital images and/or compressed codestreams are archived. From their PC or workstation, the post-processor will make a request for a certain number of frames, a specific spatial region within the frames, and a desired reduced resolution and/or a desired reduced quality level.

In response, the DI application extracts and decompresses the packets required to render the proxy images at the requested spatial region, resolution and quality on the post-processor's workstation. This enables the editor, colorist, special effects artists, etc. to tailor the proxies they view to their specific and changing needs and personal preferences and the changing content of the motion picture. Furthermore, they can change their request to view different regions, resolutions or quality levels and may even simultaneously request two or more different views of the same image or sequence of images. The proxies are generated dynamically as needed from the compressed stored images themselves. No fixed proxies are created or stored.

Post-processing generates a decision list or lists that include all of the operations that were performed on the dynamic proxies (editing, color correction, special effects, titles, etc.). The DI application applies the decision list(s) to the stored (not archived) codestream to incorporate the post processing operations by extracting the relevant packets from the codestream. The relevant packets include a subset of the packets extracted to render the proxy (some of these packets may not be modified) plus additional packets. Additional packets are necessary for example, when the rendered proxy is less than full (or desired output) resolution and/or full (or desired output) quality. The DI application decompresses the relevant packets (if necessary), performs the post-processing operations per the decision list, recompresses the data (if necessary) and inserts the packets back into the stored codestream at the appropriate locations. In most cases, some decompression and recompression will be necessary but, for example, frame selection and reordering do not require it.

The DI process is then repeated for each post-processing stage. Once the last decision list has been applied, the codestream is output as the "digital master" in a compressed format, suitably JPEG2000. The digital master is decompressed and written out to film. The digital master may also be "reduced" by either dumping bits from the codestream or transcoding it into a different JPEG2000 format to provide a "digital distribution master" for digital exhibition.

In an alternate embodiment, the stored codestream is not updated by the decision lists as they are created. Instead the original codestream is maintained and the decision lists are stored as nodes in a decision tree as they are created. This allows different decision lists to be created for different media or displays ("Exhibition Format"). For example, the cuts for film, DVD and broadcast TV may be different. The color correction for film and digital exhibition on TV is also different. This requires "previous" decision lists in the tree to be applied to the rendered proxy, possibly in real-time, while the current post-processing task is carried out. In another embodiment, the post-processing tasks common to different exhibition formats are performed upfront and the decision lists are applied to the codestream. Then the distribution specific post-processing tasks are performed with the unique sequences of decision lists (branches) being stored separately.

Storing some or all of the decision lists for different exhibition formats separately from the compressed codestream provides considerable flexibility in the creation of multiple digital distribution masters. The decision lists along a given branch in the tree (for a given exhibition format) are applied sequentially to the codestream by extracting affected packets, decompressing, applying the decision list and recompressing or by extracting the packets affected by all the decision lists, decompressing, applying all the decisions lists and recompressing. Furthermore, if the resolution, quality or spatial extent of any subsequent transcoding (MPEG, WM-9) or the display ("Distribution Format") for distribution are known, the compressed codestream can be reduced by extracting only the required spatial region, resolution and quality.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 is a flowchart of the steps for applying decision lists to the compressed codestream;

FIG. 6 is a diagram for writing the digital master to film and a digital distribution master;

DETAILED DESCRIPTION OF THE INVENTION

The present invention provides for digital intermediate (DI) processing by dynamically rendering proxies in response to client requests.

The features of scalable codecs such as JPEG2000 can be exploited to perform DI processing employing high resolution/high quality compressed images in accordance with the present invention. While the invention is described with respect to JPEG2000 it is clear that any image representation having similar scaling properties may be used. For example, efforts have begun within MPEG (Motion Picture Experts Group) on a project known as SVC (scalable video coding). Similarly, while the invention is described for DI processing (assuming film capture), it is clear that the invention is applicable when video cameras, digital cinema cameras or other electronic capture and/or recording devices are employed. In this case, the digital data may be compressed on-camera using JPEG2000, or compressed post capture (also using JPEG2000). Such compression may be very high quality (perhaps lossless). Finally, although the DI process is described in the context of a Client-Server network it is to be understood that other configurations are possible. For example, all of the storage, processing, creation and distribution steps may be performed by a single software application operating on a single computer.

At the very high 2 k and 4 k resolutions associated with film, the compression performance of JPEG2000 rivals or exceeds the compression performance of other traditional and state-of-the-art video coders. For the highest resolution digital applications such as digital cinema exhibition, JPEG2000 can be used to both perform the DI process and to distribute the motion picture. For lower resolution digital applications such as DVD, videotape, TV, JPEG2000 may be used to perform the DI process with another video coder (MPEG, WM-9) used for distribution.

Figure 1:
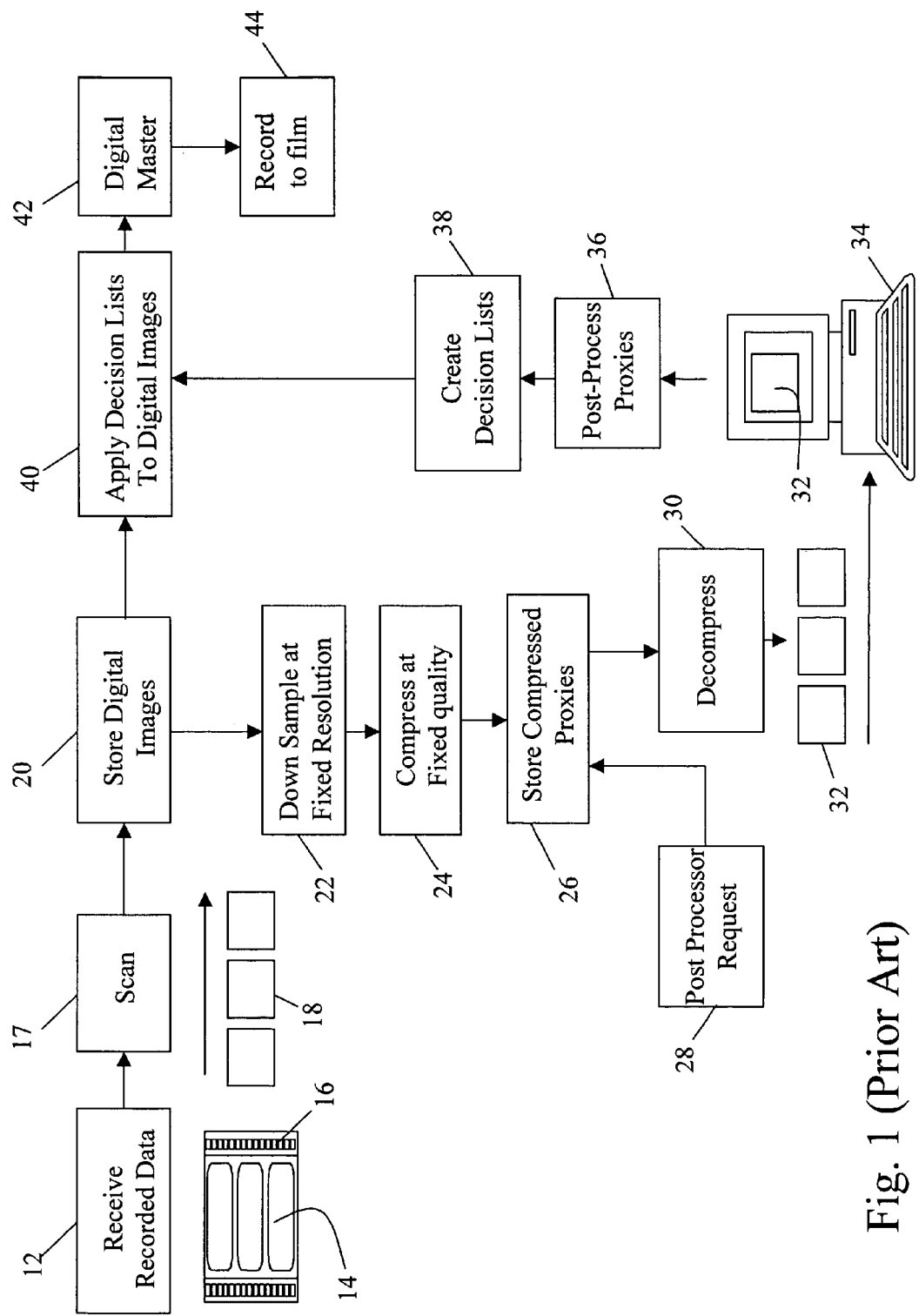
FIG. 1, as described above, is a flowchart of the conventional DI process in which a fixed proxy is created to facilitate real-time editing.
Figure 2:
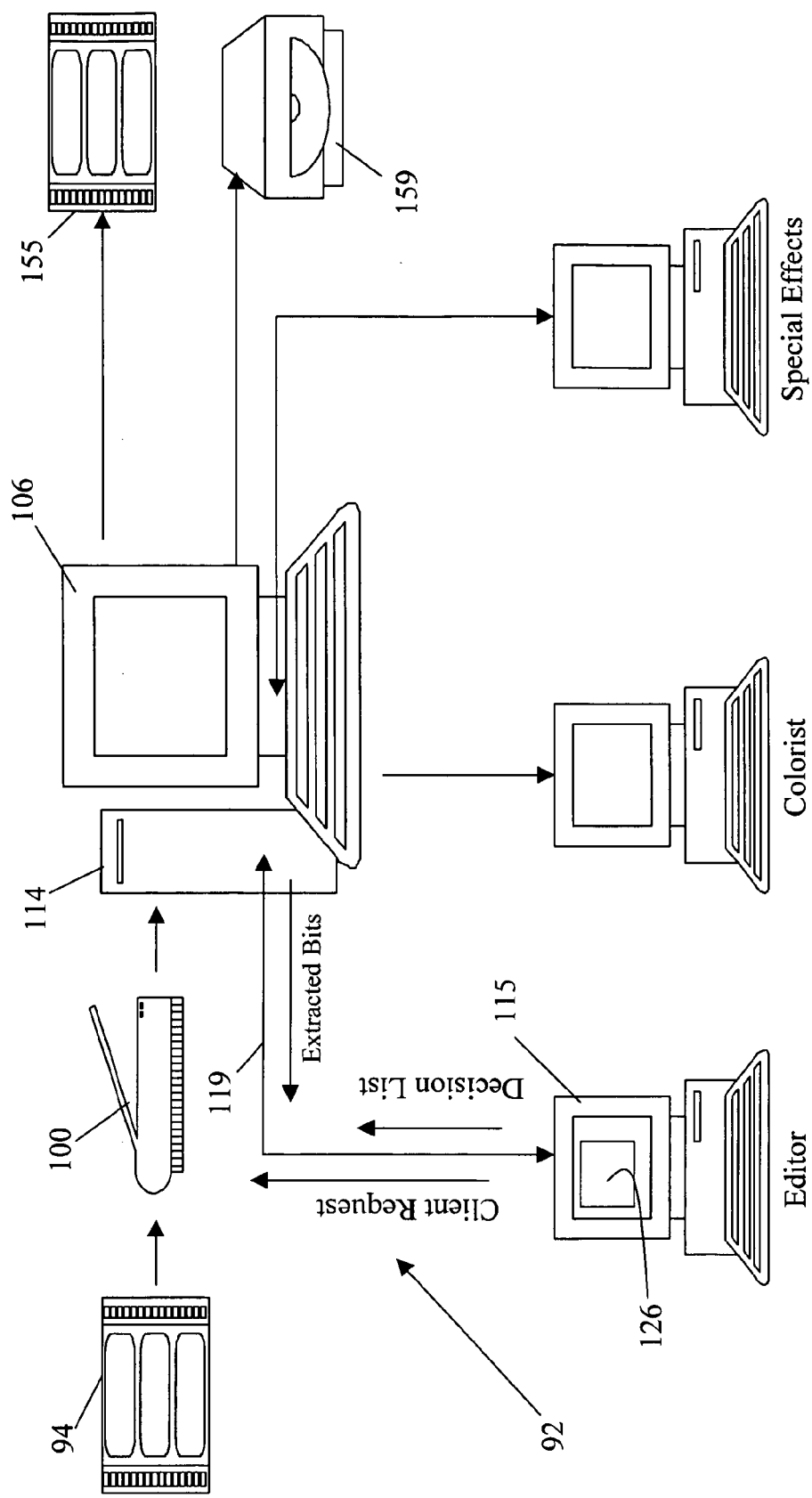
FIG. 2 is a block diagram of a client-server network for DI processing in accordance with the present invention.
Figure 3:
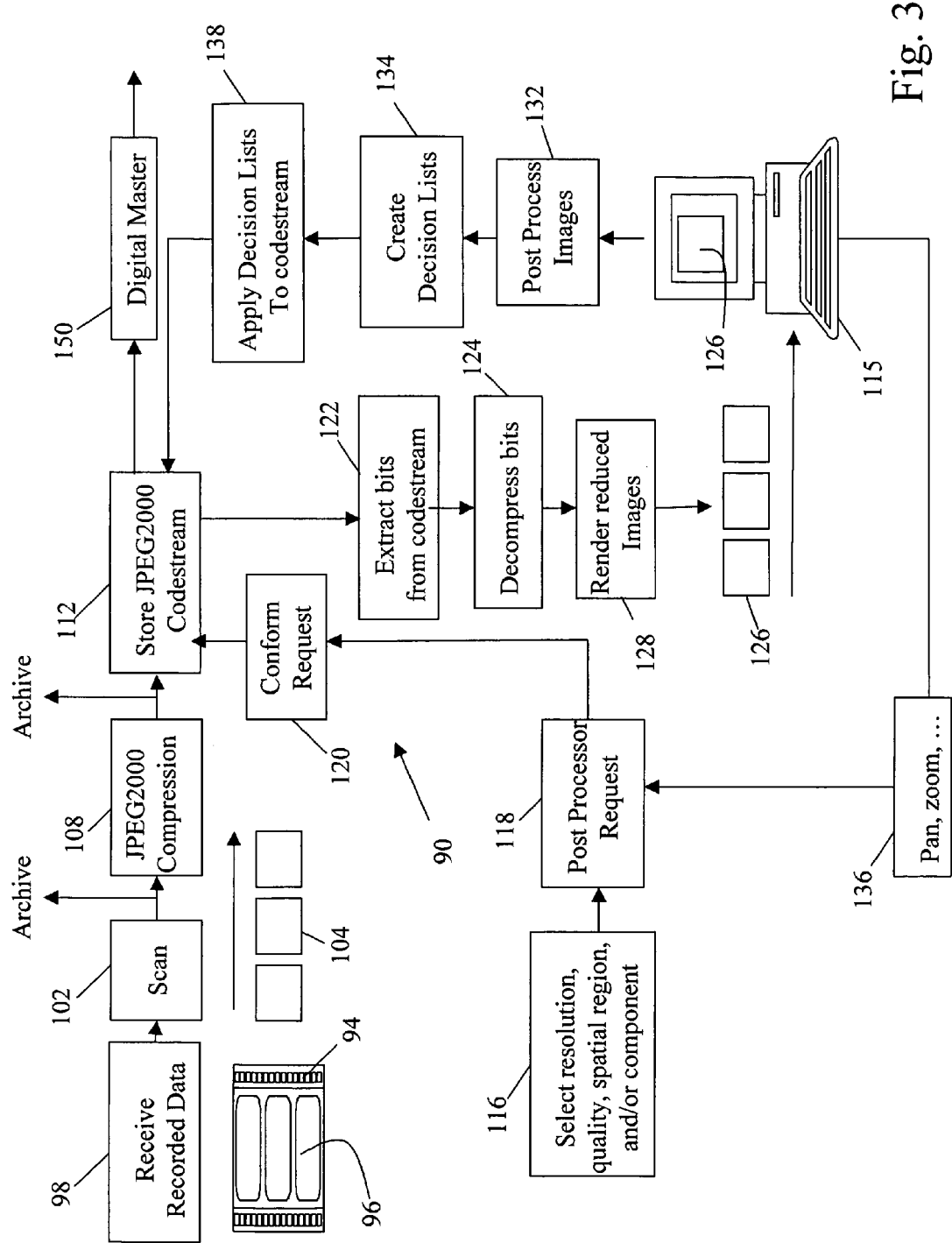
FIG. 3 is a flowchart of a DI process using JPEG2000 for film and digital cinema exhibition in accordance with the present invention.

As shown in FIGS. 2 and 3, a DI application 90 is implemented in a client-server architecture 92 to perform DI processing on high resolution/high quality compressed images by exploiting the scalability and random access features of JPEG2000. A post-house is typically provided with original recorded data (film 94) consisting of a sequence of images 96 (step 98). A scanner 100 scans each image 96 (step 102) to create a digital image 104. A server 106 compresses the sequence of digital images using JPEG2000 (or a similar scalable coder) (step 108) at a very high quality, possibly lossless, and stores the compressed codestream 110 (see FIG. 4) (step 112) in mass storage 114. The original uncompressed and/or compressed digital images are typically archived for safe keeping.

A "post-processor" working at his or her client workstation 115 selects the desired frames of a film, chooses the resolution, spatial region, quality level and/or color component (step 116) and issues a request (step 118). A default initial request might be to retrieve all desired frames at full spatial extent, a reduced resolution, medium quality, and all color components. The postprocessor may make multiple simultaneous and different requests from the same codestream. For example, the post-processor may want to view a low res version of the entire image concurrently with a high res version of a particular region of the image. The post-processor may work on one, some or all of the rendered images simultaneously or in sequence. Furthermore, in some cases, multiple post-processors (editors, colorists, special effects people, etc.) can make different requests simultaneously.

The client workstation 115 may be collocated with the server 106 in, for example, a post-house, or remotely located at, for example, the post-processor's own studio or home. In either case, the server must transmit a lot of data over a communications channel 119, e.g. Ethernet, firewire, internet, etc. For remote clients, the communications channel may be "band limited", e.g. too slow to transmit the data to dynamically render the requested proxies in an interactive work environment. One approach would be to download the entire compressed codestream to the remote client's workstation off-line and then proceed as already described. However, this approach would take a lot of time, require the client to have sufficient storage for the entire film and would release the entire codestream from the control of the post-house. Alternately, the post-processor sends an initial client request to the server specifying one or more scenes and possibly the post-processing step that will be performed. The server extracts the packets for those scenes at a reduced resolution and/or quality level and transmits them over the band limited channel to the remote client workstation. The reduced resolution and/or quality level may be fixed at levels that still provide very high quality images but with fewer bits or may be determined based on a priori knowledge of the channel capacity, requirements of the post-processing steps to be performed and/or the capabilities of the particular client workstation. The client receives the packets and stores them locally. Thereafter, all client requests for specific spatial regions at further reduced resolution and/or quality levels are processed locally to dynamically render the proxies. Once complete, the decision list is transmitted back to the server.

Because the post-processor has the great flexibility provided by the JPEG2000 feature set to request different regions, resolutions and quality levels, a request may be incompatible with the editing tools or sub-optimal in the sense that more information could be provided. For example, the post-processor's display may not support a 4 k image display or the workstation may not be able to render the full spatial extent of the image at high resolution and high quality for individual images and particularly at video frame rates. Postprocessors will typically view the images as both video and still frames to perform their tasks. The request can be made to conform to the system capabilities by adjusting one or more of the parameters (step 120). Alternately, a non-conforming request can be processed and made to conform at the workstation by subsampling, cropping, etc.

Conformance can be accomplished in a few ways. First, a non-conforming request could be returned to the person making the request, identifying the problem, and asking that the request be reformulated. Second, an algorithm can be implemented to manage the request formulation to ensure that it conforms. The post-processor would select the most important criteria first and the program would then limit or expand the allowable options on remaining criteria. For example, if the editor selects the entire image, the program may limit the editor to select one-quarter resolution or lower. If the post-processor selects one-quarter resolution, the program may further constrain the number of quality levels. Third, the post-processor may simply select a desired spatial region or a desired resolution by zooming in and not specify the other parameters. Algorithms take this request and optimize the other parameters based on the workstation's display size and processing capability.

In response to the request, the DI application extracts those packets that are required to render the desired spatial region at a specified reduced resolution, quality, or component from the codestream 110 (step 122), decompresses data from the packets (step 124) and renders them (step 128) into a sequence of reduced proxy images 126 on workstation 115. To minimize computations, in a preferred embodiment the application extracts only those packets that are required to render the proxy. On the initial request, the images are rendered directly from the decompressed packets. For subsequent requests on the same images, additional packets are extracted and added to the already existing packets, then decompressed to yield images with additional resolution, quality, spatial extent or color component.

Figure 4:
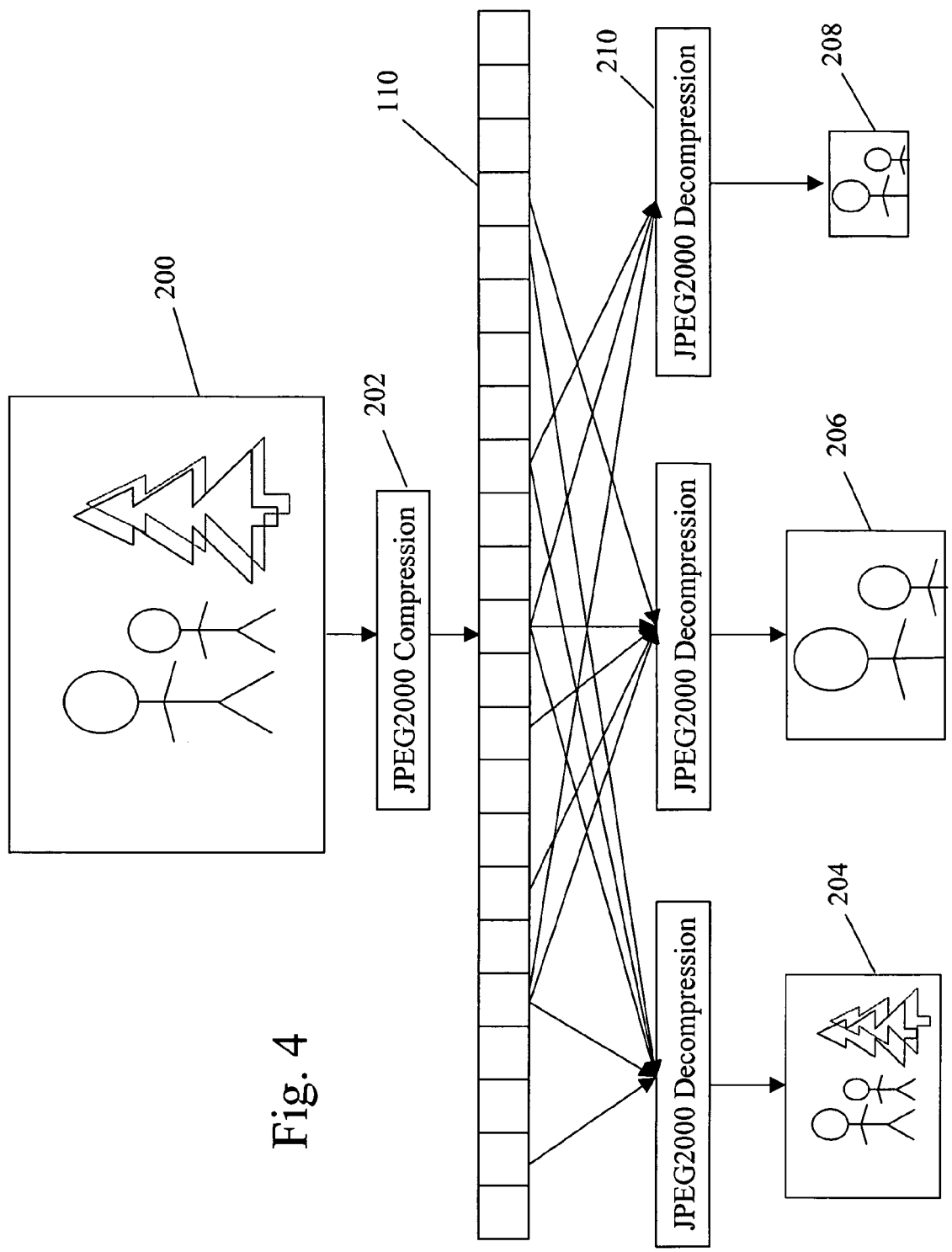
FIG. 4 illustrates the extraction of packets from the JPEG-2000 codestream to render video of different resolution, quality, spatial region and/or component.

An example of the process for extracting packets from the codestream 110 for a digital image 200 is illustrated in FIG. 4. JPEG2000 compression 202 produces a codestream 110 from which packets for a reduced resolution image 204, a reduced spatial region image 206, and a reduced spatial region and reduced resolution image 208 are extracted and decompressed 210.

The reduced digital images 126 are displayed, as stills or video sequences, on the post-processor's workstation 115. The post-processor uses a post-processing package to select and reorder frames, perform wipes, swipes, dissolves, fades, perform color correction, pan & scan, insert special effects, shot separation, re-framing, scene classification, artifact removal, resolution enhancement, noise reduction, sharpening, and verification, etc. (step 132). In many cases, these functions are performed by different people on different machines at different locations. Furthermore, some of these functions may be performed by computers with minimal or no user interaction. Each of these separate tasks generates a decision list (step 134) that records the operations performed on each reduced digital image. In performing these functions, the post-processor may wish to pan to a different portion of a frame, zoom in to a higher resolution, zoom out to the entire frame, observe various quality levels including lossless and perhaps view in black and white (step 136). Standard workstation functionality provided by the mouse, stylus etc. can be used as an interface for the reformulation (step 116) and submission of another editor request (step 118). This flexibility will greatly enhance the post-processor's efficiency and quality of the work product.

To illustrate the flexibility that the present invention brings to the DI process, assume the original images are of size 4096×2160 (4 k) and are compressed with very high quality (perhaps losslessly). When deciding which images should be included and in what order, only reduced resolution versions (such as 2048×1080) might be decompressed and displayed. Similarly, reduced quality might be employed as well. Editing decisions would be made based on reduced resolution/quality. If desired, the editor might "zoom in" to view a particular spatial region at a higher resolution. In each case, the imagery viewed by the editor is decompressed from the high resolution/high quality compressed codestream. This process generates a decision list of what images to retain and in what order.

As another example, consider color correction. Low resolution/quality versions of the images can be displayed in real-time. The colorist then works on the reduced resolution/quality versions. Once color decisions are made, they are written out to a decision list. The colorist might zoom in to get a better look at a particular spatial region. In this case, the colorist might perform correction on the zoomed in pixels. These pixels might be at full resolution, or at a resolution "in between" full resolution and the reduced resolution nominally being used to perform color correction. A similar technique might be used to spot check correction within a spatial region. After performing color correction at low resolution, the colorist might zoom in to see the results at (higher or) full resolution. The ability to zoom in to full resolution may allow the colorist to make corrections on fine details such as "red eye" that would be beyond the capability of fixed resolution proxies. Once all color correction decisions have been finalized, they are stored in a decision list for subsequent application to the full (non-reduced) compressed codestream.

As yet another example, if the original film captured a wider field-of-view than ultimately desired and the film was scanned at an even higher resolution, e.g. 5 k, the editor can pan and scan within this image to "frame" the 4 k digital image. This provides the editor, director, etc. with considerable flexibility to modify the film during the DI process without having to reshoot saving both time and money. Of course, this also applies if a digital camera is used to capture the wider field of view image at e.g., 5 k.

The DI application applies the decision list to the (non-reduced) stored codestream to incorporate the post-processing operations (step 138). As shown in FIG. 5, The DI application extracts the relevant packets from the codestream (step 140). The relevant packets include a subset of the packets extracted to render the proxy (some of the proxy packets may not be modified) plus additional packets (not extracted when rendering the proxy) if the rendered proxy was less than full (or desired output) resolution and/or quality. The DI application decompresses the extracted packets (if necessary) (step 142), performs the operations per the decision list (step 144), and recompresses the data to form modified packets (if necessary) (step 146). In most cases, some decompress/recompress will be necessary but, for example, the editing function of frame selection and reordering does not require it.

The DI application writes a codestream that includes the modified packets at the appropriate locations (step 148). In the currently preferred embodiment only modified packets are replaced in the modified codestream. Many packets in the modified codestream may remain unmodified. See FIGS. 9–13 below for details of writing the modified codestream. Modifying only corrected spatial regions avoids "noise build up" that might be experienced in existing systems where all pixels are decompressed/recompressed even when only a small spatial region is to be modified. It also avoids unnecessary computations, thus accelerating the process. However, a full decompress and recompress on the entire post-processed region or even the entire image may be performed if so desired.

The DI process is repeated for each post-processing stage. Once the last decision list has been applied, the compressed codestream is output as the "digital master" 150 in a compressed format, suitably JPEG2000. As shown in FIG. 6, the digital master 150 is decompressed (step 154) and written out to film 155 (step 156). The digital master may also be "reduced" (step 158) by either dumping bits from the codestream or transcoding it into a codestream having different JPEG2000 parameter values to provide a digital distribution master stored on suitable digital media, for example, hard disc, magnetic tape or DVD 159 for digital exhibition (step 160).

Figure 7A:
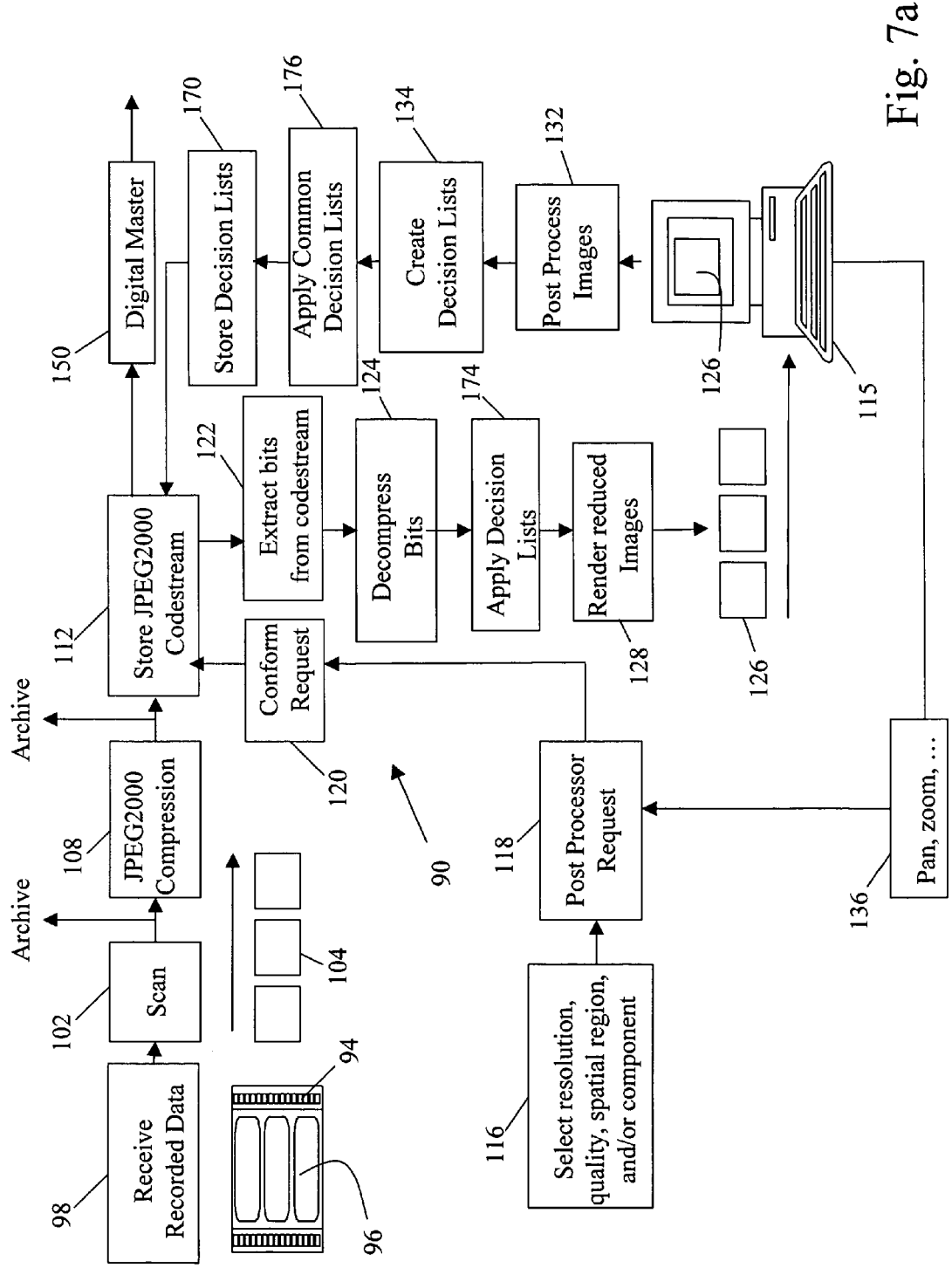
FIGS. 7a–7b and 8 are diagrams of the DI process and creation of the digital master in which some or all of the decision lists are stored.
Figures 7B, 8:
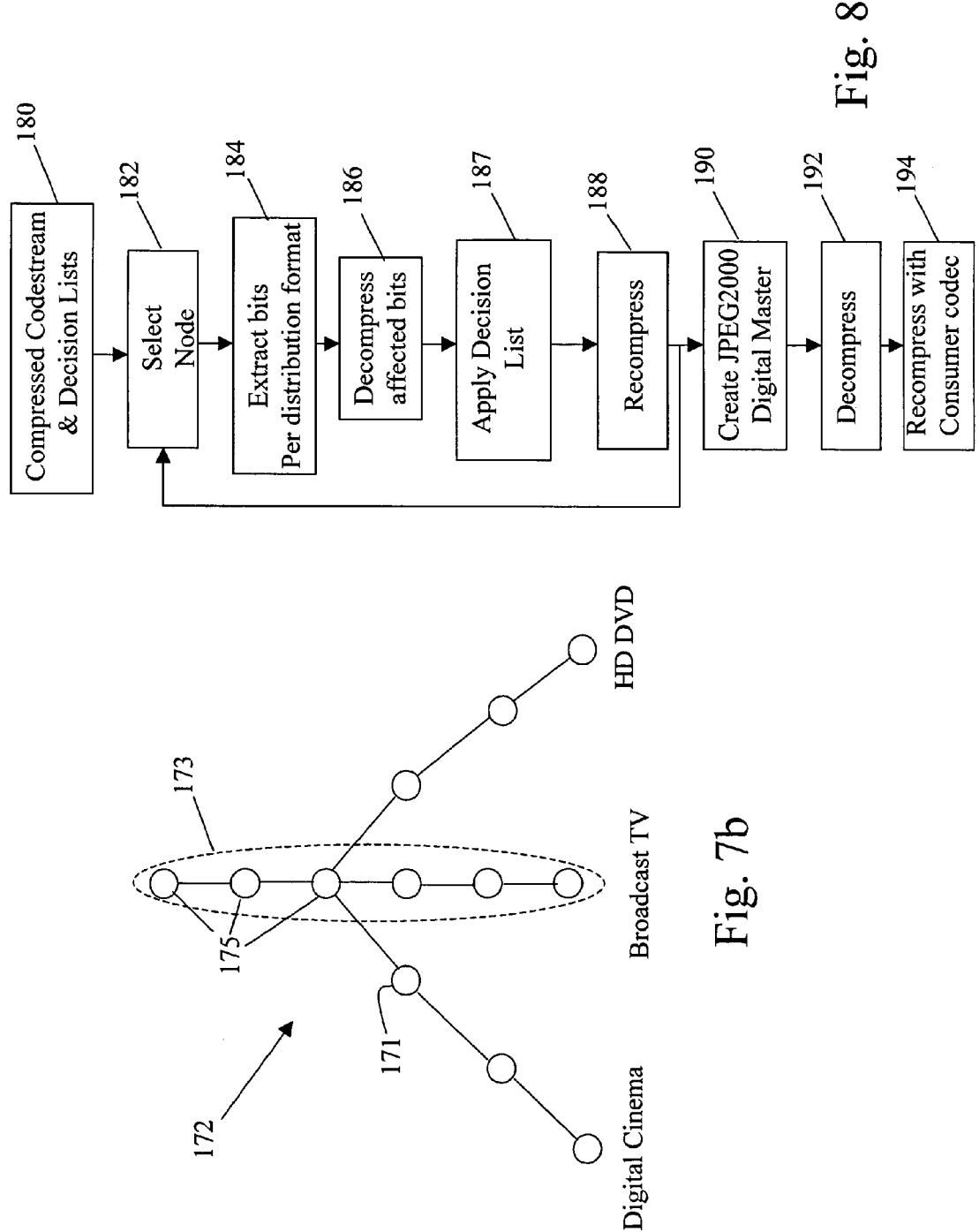

In an alternate embodiment for authoring and distributing content, the stored codestream is not updated after each post-processing task. As shown in FIGS. 7a and 7b, the original codestream 112 is maintained and the decision lists are stored (step 170) as nodes 171 in a decision tree 172 as they are created along branches 173 for different exhibition formats. For example, the cuts for film, HD DVD and broadcast TV may be different. The color correction for film and digital exhibition on TV is also different. The tradeoff is that the post-processing tasks along a branch 173 in the tree must be applied to the rendered proxy (step 174), possibly in real-time, for the "current" post-processing task to be carried out. Note, only those post-processing tasks that overlap spatially with the rendered proxy must be applied. In another embodiment, the common post-processing tasks (common nodes 175) are applied to the codestream (step 176). The separated branches 173 including the non-common nodes are stored (step 170) and applied to the rendered proxies as needed.

As shown in FIG. 8, storing some or all of the decision lists for different media separately from the compressed codestream provides considerable flexibility in the creation of multiple digital distribution masters. In this case the Digital Master is comprised of the compressed codestream and decision tree 180; either the original codestream and the entire tree or a codestream with common nodes already applied together with the unique branches. For a given exhibition format, the decision lists corresponding to the nodes along a given branch in the tree are applied sequentially to the codestream. The first node is selected (step 182) and packets are extracted based on the distribution format (step 184). The bits from the affected spatial regions are decompressed (step 186) and the decision list for the selected node is applied to perform the operations (step 187). Thereafter, the processed bits are recompressed (step 188). This process is repeated to create a media specific JPEG2000 digital master (step 190). Alternately, it may be possible to extract the regions affected by all the decision lists, decompress, apply all the decisions lists and recompress using JPEG2000 or the target output codec. A full decompress and recompress on the entire image may be performed if so desired. The digital master can be reduced as described above to create a JPEG2000 digital distribution master or decompressed (step 192) and recompressed with a different codec such as MPEG or WM-9 (step 194). Alternately, beginning with the compressed codestream and decision lists 180, all data can be decompressed, the appropriate decision lists applied, followed by recompression with JPEG2000 or a different codec.

As described above, post-processed pixel data are compressed and formed into packets and written back to the JPEG2000 codestream. Since the pixel data have been modified, the wavelet coefficients within a relevant codeblock differ from their values before post-processing. Accordingly, each compressed coding pass length may differ from its length prior to editing. Indeed, there may be more/less "missing" all zero bitplanes and/or more/less discarded "least significant" coding passes/bitplanes, resulting in a different total number of coding passes for a relevant codeblock.

Generally then, the length of the relevant packets will differ from that prior to post-processing. Consequently, the post processed codestream can be generated by either (a) rewriting all or substantially all of the codestream or (b) forcing the portion of modified data to have the same length as the corresponding original portion of stored data (sets of contiguous packets, individual packets or codeblocks within packets). In case (b), the post processed codestream can be created by merely overwriting the modified portions of the codestream.

If there are to be multiple sequential post-processing tasks performed, it may be desirable to store the results (modified codeblock and/or packet data) of intermediate modifications via a data structure such as a linked list. Once all post-processing tasks are complete, the final compliant JPEG2000 codestream can be obtained. This technique may be used in both case (a) and case (b).

In the first case (a), no attempt is made to control the length of modified data. This may make it necessary to rewrite substantially all of the compressed codestream. This rewriting could be avoided by leaving the edited codestream stored using a linked list as mentioned above. However, if the file is to be stored as an ordinary compliant JPEG2000 codestream, rewriting will generally be necessary. It should be emphasized that no packets outside those being post-processed (the relevant packets) need to be modified. Non post-processed packets are merely copied to the newly edited codestream in the appropriate order to create a sequence of contiguous packets as required by the codestream syntax.

Figure 9:
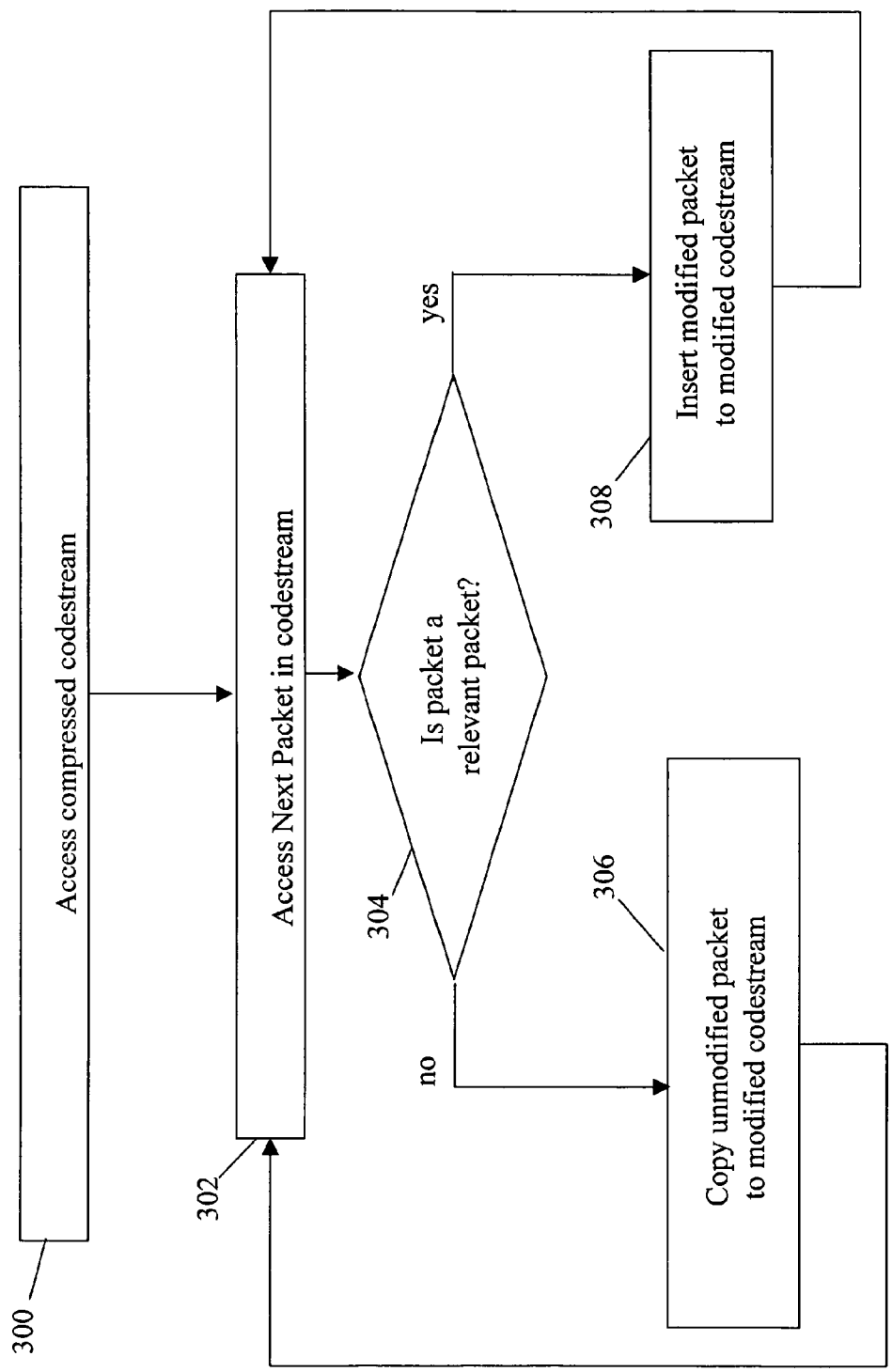
FIG. 9 is a flowchart for rewriting a post-processed codestream with variable length data.

The process of rewriting the codestream is shown in FIG. 9. In that figure, each unmodified packet is copied from the unedited compressed codestream to the modified compressed codestream, replacing modified packets where appropriate. Specifically, starting at the beginning of the compressed codestream (step 300), each packet is accessed in turn (step 302) and tested to determine its relevancy (step 304). If the packet is not relevant to the post-processing (the packet is unmodified), it is copied directly to the (new) modified codestream (step 306). If the packet is relevant, the unmodified packet is discarded, and the modified version of the packet is inserted into the modified codestream (step 308).

Figure 10:
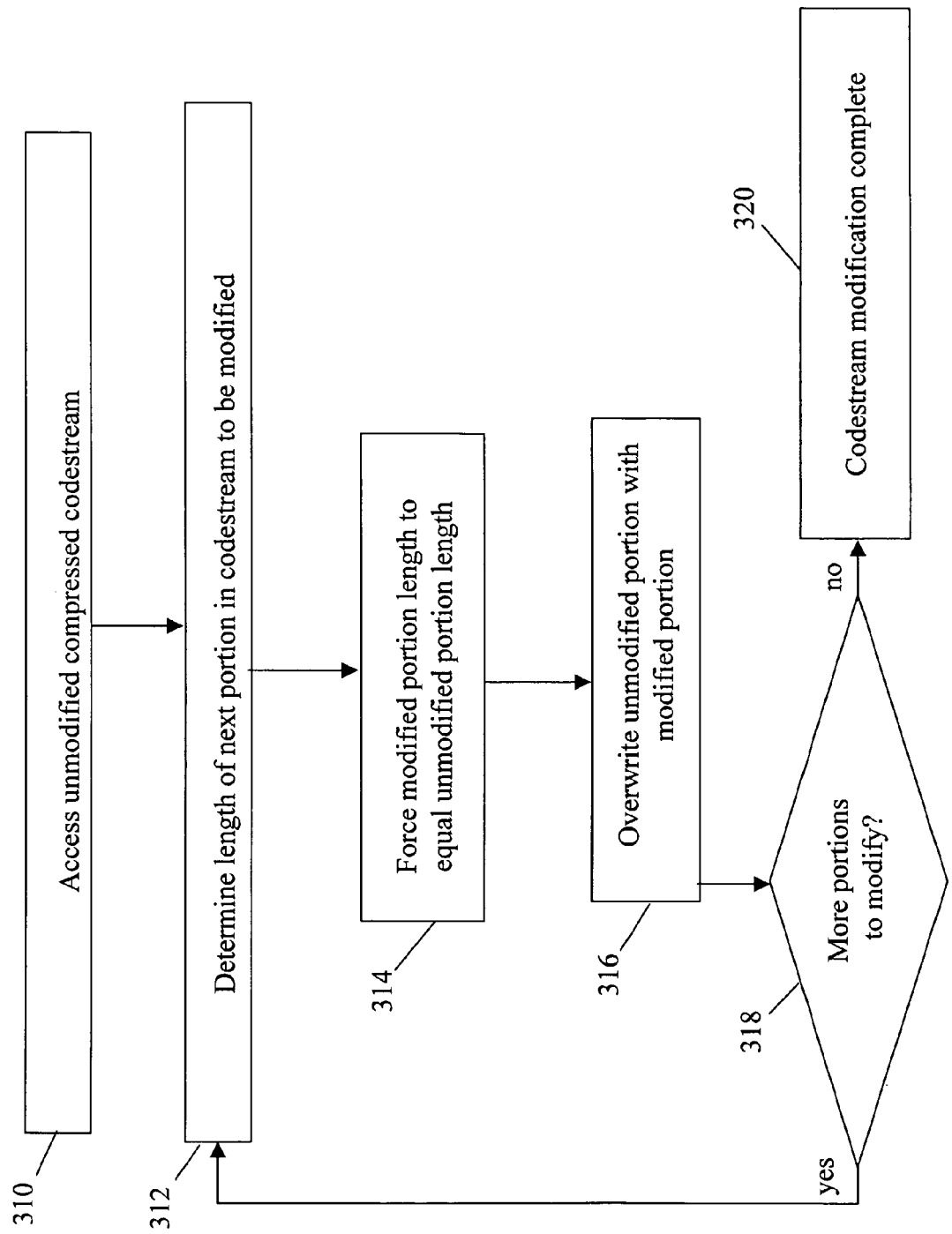
FIG. 10 is a flowchart for rewriting a post-processed codestream with fixed length data.

In the second case (b) as shown in FIG. 10, the input/output requirements can be reduced by avoiding substantial rewriting of the codestream. This can accelerate processing speeds even further. As shown in FIG. 10, the unmodified compressed codestream is accessed (step 310). The length is determined for the first portion of the codestream to be modified (step 312). The corresponding modified portion of the codestream is forced to have this same length (step 314). The unmodified portion is then overwritten by the modified portion (step 316). This process is repeated for each portion of the codestream that needs modification (step 318) until the process is complete (step 320). In one embodiment of case (b), an attempt is made to force each post-processed packet to have the same length as its original version. In this way, each old packet can simply be overwritten by the corresponding new packet. This method is particularly useful when packets belonging to a desired spatial region are highly dispersed within the codestream, e.g., when the codestream is in LRCP progression order.

Equal Length Packets with Single Codeblock

It may be that only a subset of codeblock data within a relevant packet is needed for a particular post-processing task. For example, only a subset of the codeblocks may contribute to a particular spatial region. In such cases it is possible to decompress, process and recompress all codeblock data within a packet; or preferably only the subset of codeblock data that contributes to the spatial region. Whichever the case, a codeblock is called relevant if it is decompressed, processed and recompressed.

Assume first that there is only one relevant codeblock within a particular precinct. Let Bi be the number of bytes from the unedited version of such a codeblock in packet i for the relevant precinct. Here i runs from 0 to N−1, where N is the number of quality layers. The number of bytes of coding pass data included in packet i from the edited codeblock (plus any net change in packet header length) must equal Bi.

Figure 11:
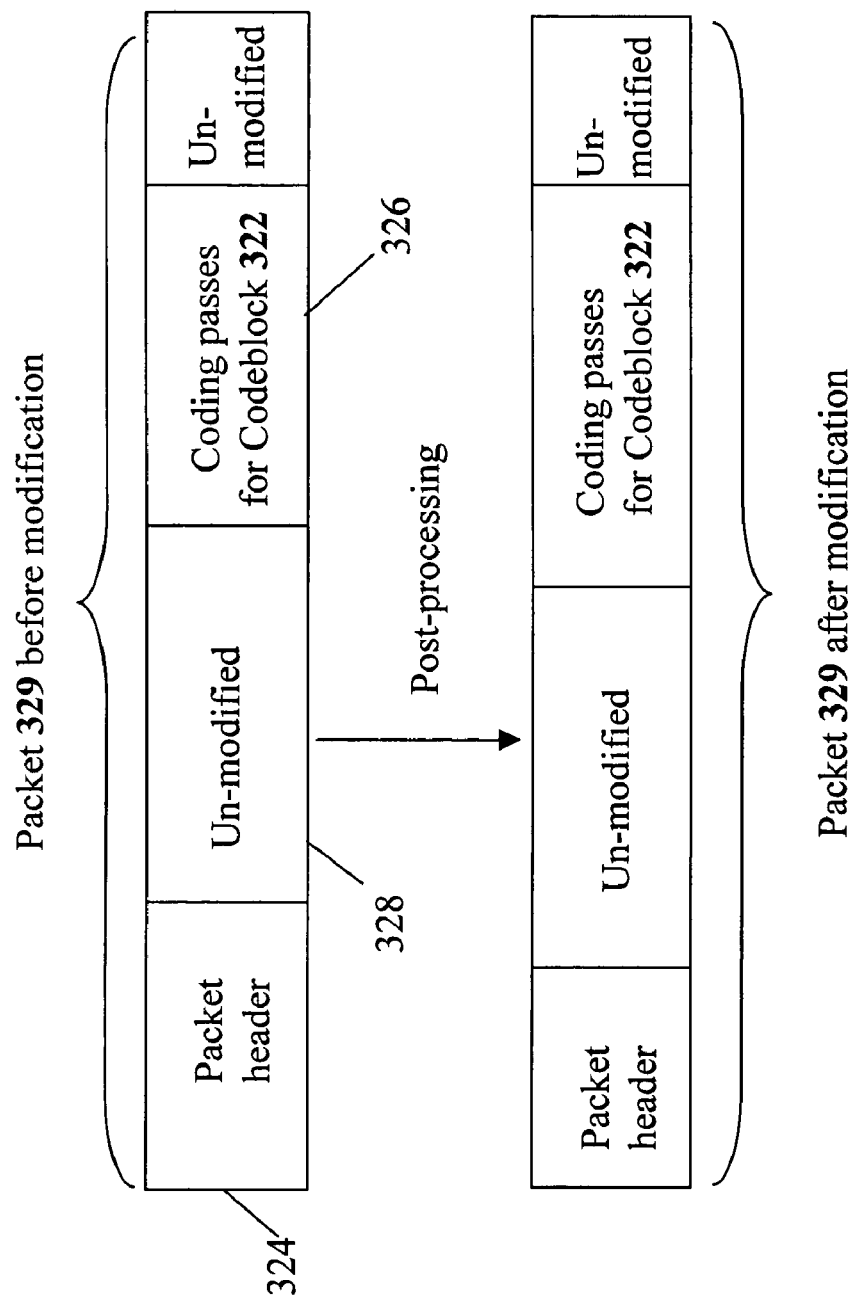
FIGS. 11–13 are diagrams for different embodiments for fixing the length of post-processed data to that of the compressed codestream.

This situation is shown for a particular codeblock 322, in FIG. 11. In this example, the packet header 324 is shortened, the coding pass data 326 for codeblock 322 are lengthened and the portions of data for all other codeblocks 328 are unmodified, but the length of packet 329 remains unchanged.

There is considerable flexibility to pursue this goal of preserving packet length. For a given number of coding passes claimed to be included in a packet (according to the packet header), there must be at least enough bytes of coding pass data included in the packet to decode this number of coding passes. (This is referred to below as the "sufficient bytes" requirement). Significantly, it is allowable to include "extra" bytes that might nominally belong to coding passes claimed to be included in the next packet (i+1) for the same precinct. This allows some flexibility in the length of coding pass data included in a given packet.

It is worth noting that it is possible to implement a decoder that will sensibly decode a codestream that violates the sufficient bytes requirement. Indeed, some implementations will decode sensibly in this case, even though the designer did not specifically intend this. Nevertheless this is not recommended, as the resulting codestream is not strictly JPEG2000 compliant, and may fail to decode on some decoders.

In addition to the flexibility in the length of coding pass data described above, there is some flexibility with respect to the creation of packet headers. The number of bytes included from the codeblock (as claimed in the packet header) can be coded in a suboptimal way, generally increasing the length of the packet header. Other data in the packet header (coded using data structures called "tag trees") can also be coded in a suboptimal manner, generally lengthening the packet header. From the discussion of the sufficient bytes requirements above, it is allowable for "extra" coding pass bytes to be included in a packet. Thus, the number of coding passes claimed (by the packet header) to be included in the packet may be decreased (without changing the number of coding pass bytes), generally decreasing the length of the packet header.

If a start of packet marker segment is present before or after the packet, it may be deleted to effectively decrease the packet length. Similarly, a tile-part header may be deleted before or after a packet.

If it is known that an error resilient decoder will be employed, start of packet marker segments can be employed to effectively lengthen a packet even further. In this case, padding bytes (preferably not containing two consecutive bytes having value larger than hexadecimal FF8F) are inserted at the end of the packet then followed by a start of packet marker segment. The lengths of the "unpadded" data are correctly signaled in the packet header. After reading the unpadded data, the decoder can scan for the presence of the start of packet marker segment in order to seek past the padding bytes, and find the beginning of the next packet.

Another method to adjust the length of coding pass data, as well as the packet header length is to code one or more leading zero bit planes into coding passes, rather than signaling them as "missing" via the packet header. This amounts to suboptimal coding of coding pass data and will generally increase the total number of compressed coding passes, as well as modifying their individual lengths. It will typically also have some effect on the length of the packet header. Unfortunately, coding leading zero bitplanes requires re-coding of all coding passes within the codeblock, thus increasing computational complexity.

It is worth noting that some of the methods described above to lengthen or shorten packet headers are complicated by the fact that a bit stuffing procedure is used when writing packet headers. This bit stuffing is used to avoid the appearance, of any two consecutive bytes having hexadecimal value larger than FF8F.

As an example illustrating some of the techniques above, consider the following: Starting from the first byte of coding pass data not included in a previous packet (e.g., 0, 1, . . . , i−1) for a given precinct, take the first Bi bytes of coding pass data from the edited codeblock. If these new Bi bytes together with bytes from packets 0, 1, . . . , i−1, are at least enough to decode the number of coding passes indicated by the packet header, no further action is required. If the Bi bytes are insufficient to decode the number of coding passes indicated by the packet header, the packet header may be updated accordingly to reflect a smaller number of coding passes. Unfortunately, this may in turn change the length of the packet header. If as a result, the packet header is lengthened, bytes of coding pass data can be removed from the packet (deferred to the next packet for the relevant precinct). If the packet header is shortened, additional bytes of coding pass data can be included (advanced from packet i+1), or the packet header can be recoded (suboptimally) to increase its length. In the end, the coding pass and packet header lengths (together with any leading or trailing marker segment or tile-part header) must be resolved so that the total length remains unchanged and the packet header accurately describes the contents of the packet.

Equal Packet Lengths with Multiple Codeblocks

Figure 12:
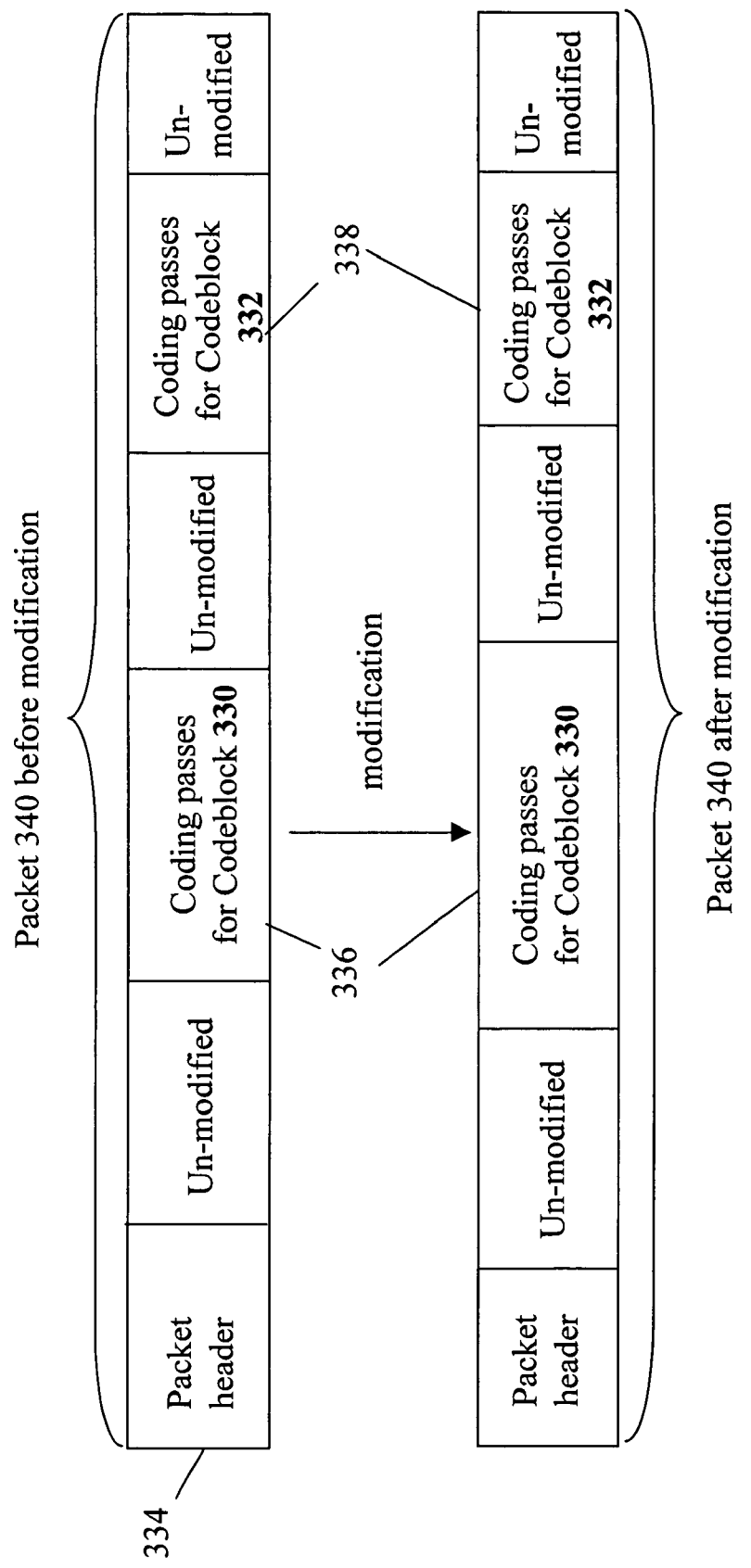

When there are multiple relevant codeblocks within the same precinct, there is even more flexibility available to ensure packet lengths remain constant. In this case, the total space occupied within the packet by all relevant codeblocks, plus any net change in the packet header length, must remain fixed. By "pooling" the combined space of all relevant codeblocks, the constraints on any given codeblock are significantly reduced. This situation is shown in FIG. 12 for two relevant codeblocks 330 and 332. The lengths of the header 334 and both sets of codeblock coding passes 336, 338 are allowed to vary. But, the overall length of packet 340 is unchanged. When codeblock space is pooled in this manner, there will often be enough flexibility to allow additional goals to be met. For example, it will generally be possible to achieve (at least approximately) constant quality encoding, at each layer, for each relevant codeblock within a precinct.

In some cases, it may be desirable to include some (perhaps all) non-relevant codeblocks into the pooling for a relevant precinct. In other words, other/all codeblocks are treated as if they are relevant (for the purpose of packet formation) even though they were unaffected by the post-processing of pixel data. This may give added flexibility to achieve the desired goals (fixed length, constant quality, etc.). Bytes from non-relevant codeblocks may be deferred to (or advanced from) future packets for the same precinct. This will generally change pixels (at intermediate quality layers) that would not have been changed if non-relevant codeblocks were not included in the pooling. It is likely however that at the final quality layer, such pixels can remain unchanged (or changed very little). This is due to flexibility described above, plus some added flexibility afforded at the end of each codeblock bitstream.

From the sufficient required bytes discussion, it is clear that extra bytes can be added to the end of the codeblock codestream. If the end of the codeblock codestream is not terminated, arbitrary padding bytes (not above FF8F) can be used for this purpose. If the codeblock codestream is terminated, the situation is a bit more complicated. Normally, it is desirable to terminate each codeblock bitstream so that it has the shortest length possible. However, it is allowable to use a termination policy that results in a longer codeblock bitstream, effectively increasing the number of bytes for the last coding pass(es) of a codeblock. As a final note, such termination policies may be employed between individual coding passes when certain modes of JPEG2000 codeblock coding are employed.

The padding and extended termination methods of lengthening codeblock data as described in the previous paragraph are not generally preferred. One of these may need to be used in the case of lossless compression, or compression using a quantization step size large enough to limit the number of bitplanes that can be coded. When these two limitations are not present, it is preferable to actually include more compressed coding pass data.

It is worth noting that pooling can be used to purposely take bits from non-relevant codeblocks to give higher quality representation to relevant codeblocks. Codeblocks which were not post-processed will then be modified in this embodiment. Although this "expands" the post-processed region somewhat, the expansion is still bounded by the precincts which contain wavelet coefficients within the original region to be post-processed.

Equal Length Contiguous Packets

Figure 13:
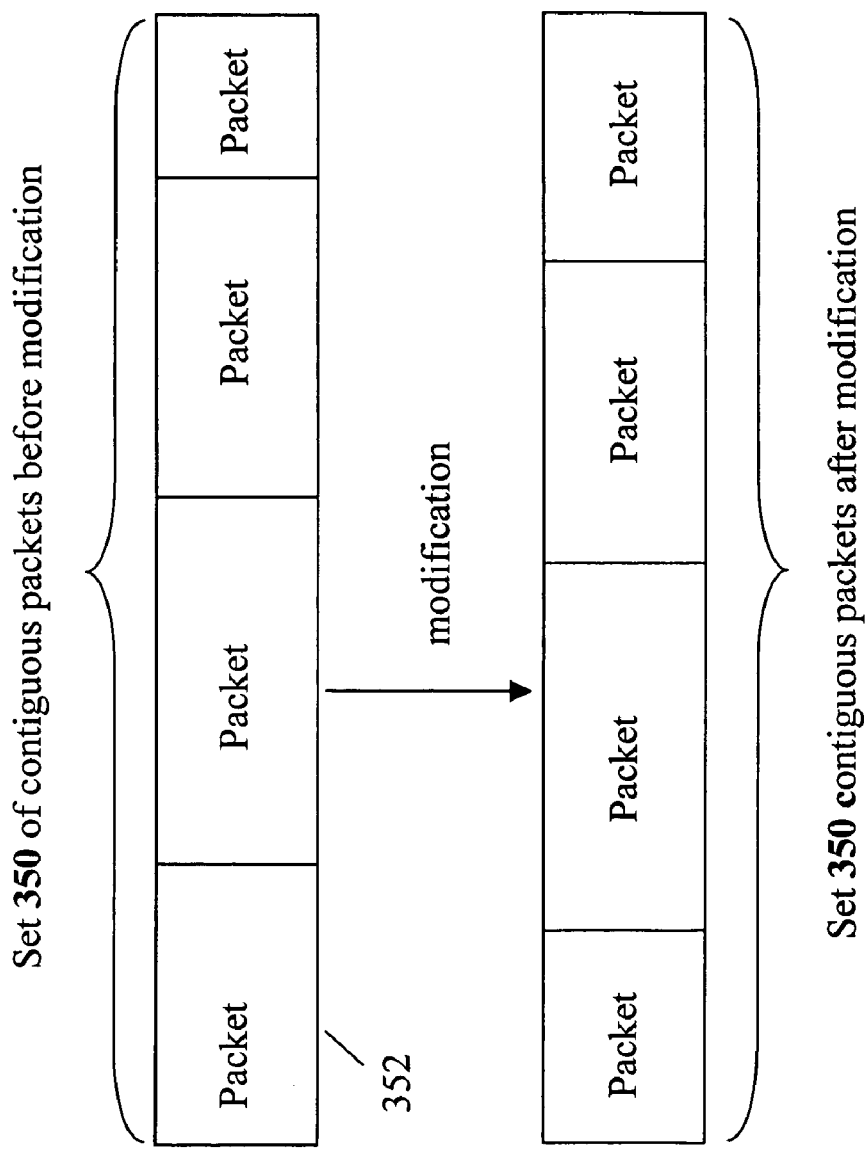

Pooling (with or without "expansion" of the post-processed region) can be considerably more effective when multiple relevant packets appear contiguously within the codestream. This may occur for certain progression orders, especially PCRL. In this case, the length of individual packets need not remain unchanged. As shown in FIG. 13, only the total length of a set 350 of contiguous packets 352 must remain unchanged. In this way, the contiguous sequence of new packets can overwrite the contiguous sequence of old packets within the same space in the codestream.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of digital intermediate (DI) processing, comprising:
   a) providing a scalable compressed codestream for a sequence of digital images, said codestream providing random access to packets of compressed data to extract spatial regions of the images at a plurality of resolutions and/or a plurality of quality levels;
   b) in response to a client request for certain images in the sequence in a spatial region at a reduced resolution and/or reduced quality level, extracting the appropriate packets from the compressed codestream;
   c) decompressing data from the packets to reconstruct and dynamically render a proxy image; and
   d) post-processing the proxy image to create a decision list of operations performed on the proxy image.

2. The method of claim 1, wherein steps b through d are repeated for a plurality of post-processing functions.

3. The method of claim 2, further comprising applying the decision lists to the digital images.

4. The method of claim 2, wherein said decision lists are stored at each iteration.

5. The method of claim 4, further comprising:
   applying the stored decision lists to the decompressed data when rendering the proxy image.

6. The method of claim 5, wherein only the decision lists that spatially overlap the rendered proxy image are applied.

7. The method of claim 4, wherein decision lists are created for a plurality of exhibition formats and stored as nodes in a decision tree having branches that correspond to the respective exhibition formats.

8. The method of claim 7, wherein the tree has at least one shared node in each decision list.

9. The method of claim 7, further comprising applying the decision lists in a branch by:
   Selecting a first node from the branch corresponding to the particular exhibition format;

Performing the operations on the image data specified by the decision list;

Repeating these steps for each decision list in the branch.

10. The method of claim 1, further comprising discarding the processed proxy image once the decision list is created.

11. The method of claim 1, wherein only the packets that are required to render the proxy image are extracted from the compressed codestream.

12. The method of claim 1, wherein the client issues a plurality of requests for different proxy images to perform the post-processing function and to create one said decision list.

13. The method of claim 12, wherein at least two requests are issued to render different proxy images concurrently, one or more of said images being post-processed to create the decision list.

14. The method of claim 1, further comprising in response to a client request, selecting a reduced resolution and/or reduced quality consistent with the client's rendering capability.

15. The method of claim 1, wherein the sequence of digital images is captured at an input frame size, said post-processing including pan and scan of an output frame size within the input frame size.

16. The method of claim 3, wherein the decision list is applied to the digital images by extracting packets from the compressed codestream including packets used to render the proxy image and additional packets for resolution and/or quality levels not rendered in the proxy image.

17. The method of claim 3, wherein the decision list is applied to the digital images by, Extracting relevant packets from the compressed codestream that are affected by the decision list, Decompressing the relevant packets into image data;

Performing the operations on the image data specified by the decision list;

Recompressing the modified data into modified packets; and generating the compressed codestream including both the modified and unmodified packets.

18. The method of claim 17, wherein the compressed codestream is generated by, accessing the compressed codestream;

determining whether the next packet is relevant;

if false writing the unmodified packet to a modified codestream; and if true writing the modified packet to the modified codestream.

19. The method of claim 17, wherein the compressed codestream is generated by, forcing portions of modified compressed data to have the same length as the corresponding original portions of compressed data in the compressed code stream; and overwriting the original portions of the compressed codestream with the corresponding portions of the modified compressed data.

20. The method of claim 19, wherein the portions are individual packets.

21. The method of claim 19, wherein the portions are sets of contiguous packets.

22. A method of digital intermediate (DI) processing, comprising:

a) providing a scalable compressed codestream for a sequence of digital images, said codestream providing random access to packets of compressed data to extract spatial regions of the images at a plurality of resolutions and/or a plurality of quality levels;

b) in response to a client request for certain images in the sequence in a spatial region at a reduced resolution and/or reduced quality level, extracting the packets from the compressed codestream required to render a proxy image;

c) decompressing data from the packets to reconstruct and dynamically render the proxy image;

d) post-processing the proxy image to create a decision list of operations performed on the proxy image;

e) extracting packets including packets used to render the proxy image and additional packets for resolution and/or quality levels not rendered in the proxy image;

f) Decompressing the packets into image data;

g) Performing the operations on the image data specified by the decision list;

h) Recompressing the modified data into modified packets; and i) Rewriting a compressed codestream including both the modified and unmodified packets.

23. The method of claim 22, wherein steps b through i are repeated for a plurality of post-processing functions.

24. The method of claim 22, wherein steps b through d are repeated for a plurality of post-processing functions and exhibition formats with said decision lists being stored as nodes in a decision tree at each iteration.

25. The method of claim 22, wherein only the packets that are required to render the proxy image are extracted from the compressed codestream.

26. The method of claim 22, wherein the compressed codestream is rewritten by, forcing portions of modified compressed data to have the same length as the corresponding original portions of compressed data in the compressed code stream; and overwriting the original portions of the compressed codestream with the corresponding portions of the modified compressed data.

27. A system for remote post-processing of digital images, comprising:

a central server configured to store a scalable compressed codestream for a sequence of digital images, and in response to a client request said server configured to extract and transmit packets of compressed data for a spatial region of one or more images at a specified resolution and/or a specified quality level; and at least one remote client workstation configured to issue the client request, receive and decompress data from the packets to reconstruct and dynamically render a proxy image, and post-process the proxy image to create a decision list of operations performed on the proxy image.

28. The system of claim 27, wherein in response to an initial client request for at least one scene comprising a plurality of images, said server is configured to transmit the packets for said scene at a reduced resolution and/or reduced quality level, said remote client workstation configured to store said scene locally and for subsequent client requests to extract a spatial region at a further reduced resolution and/or further reduced quality level the packets are extracted locally.

29. The system of claim 27, wherein the server is configured to extract only the packets that are required to render the proxy image from the compressed codestream.

30. The system of claim 27, wherein post-processing is repeated for a plurality of post-processing functions and exhibition formats with said decision lists being stored as nodes in a decision tree at each iteration.

31. A method of digital intermediate (DI) processing, comprising:
- a) providing a scalable compressed codestream for a sequence of digital images, said codestream providing random access to packets of compressed data to extract spatial regions of the images at a plurality of resolutions and/or a plurality of quality levels;
- b) providing a decision list of post-processing operations performed on a proxy for one or more digital images;
- e) extracting packets including packets used to render the proxy image and additional packets for resolution and/or quality levels not rendered in the proxy;
- f) Decompressing the packets into image data;
- g) Performing the operations on the image data specified by the decision list;
- h) Recompressing the modified data into modified packets; and
- i) Rewriting a compressed codestream including both the modified and unmodified packets.

32. The method of claim 31, wherein the compressed codestream is rewritten by,
- forcing portions of modified compressed data to have the same length as the corresponding original portions of compressed data in the compressed code stream; and
- overwriting the original portions of the compressed codestream with the corresponding portions of the modified compressed data.

33. A system for post-processing of digital images, comprising:
- storage configured to store a scalable compressed codestream for a sequence of digital images, and in response to a client request said storage configured to provide packets of compressed data to extract a spatial region of one or more images at a specified resolution and/or a specified quality level; and
- a client workstation configured to issue the client request, receive and decompress data from the packets to reconstruct and dynamically render a proxy image and post-process the proxy image to create a decision list of operations performed on the proxy image.

34. The system of claim 33, wherein said client workstation includes the storage.

35. The system of claim 33, wherein the storage is remotely located from the client workstation.

36. A method of digital intermediate (DI) processing, comprising:
- a) providing a scalable compressed codestream for a sequence of digital images, said codestream providing random access to packets of compressed data to extract spatial regions of the images at a plurality of resolutions and/or a plurality of quality levels;
- b) in response to a client request for certain images in the sequence in a spatial region at a reduced resolution and/or reduced quality level, extracting the appropriate packets from the compressed codestream;
- c) decompressing data from the packets to reconstruct and dynamically render a proxy image;
- d) post-processing the proxy image to create a decision list of operations performed on the proxy image; and
- e) applying the decision list to the sequence of digital images.

37. The method of claim 36, wherein the decision list is applied to the sequence of digital images by,
- Extracting relevant packets from the compressed codestream affected by the decision list,
- Decompressing the relevant packets into image data;
- Performing the operations on the image data specified by the decision list;
- Recompressing the modified data into modified packets; and
- Generating the compressed codestream including both the modified and unmodified packets.

38. The method of claim 36, further comprising:
- f) repeating steps b through d for a plurality of post-processing functions;
- g) applying all of the decision lists to the sequence of digital images.

* * * * *